Figure 1:
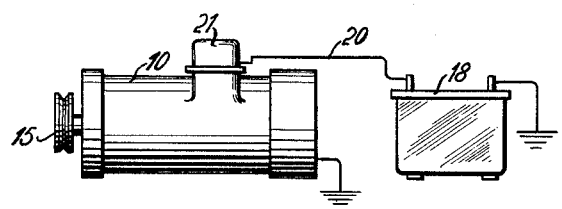

March 15, 1966   H. DOMANN   3,241,040
GENERATOR REGULATOR WITH OVERLOAD PROTECTION MEANS
Filed Oct. 10, 1962

INVENTOR
Helmut Domann by
Michael J. Striker

United States Patent Office 3,241,040
Patented Mar. 15, 1966

3,241,040
GENERATOR REGULATOR WITH OVERLOAD
PROTECTION MEANS
Helmut Domann, Stuttgart, Germany, assignor to Robert
Bosch G.m.b.H., Stuttgart, Germany
Filed Oct. 10, 1962, Ser. No. 229,547
Claims priority, application Germany, Oct. 21, 1961,
B 64,473
5 Claims. (Cl. 322—24)

The invention concerns a regulator arrangement for generators operable at greatly varying speeds, particularly for vehicle lighting generators, having a shunt exciter winding. More specifically the invention applies to the overload protection of a regulator arrangement comprising a control transistor connected in series with the exciter winding and changed alternatingly between fully conductive condition and non-conductive condition by the action of a pilot transistor the emitter-base circuit whereof is connected between the terminals of the generator so that the generator output voltage to be regulated is applied to this emitter-base circuit.

In regulator arrangements of this type the danger exists that on account of a short-circuit in the exciter winding the control transistor is overloaded because in this case the full output voltage of the generator would be applied to the emitter-collector circuit of the control transistor. This danger is particularly great in the case of operating the control transistor so that it is alternatingly changed between fully conductive condition and non-conductive condition because with this type of regulation output energies can be regulated which are substantially larger than the maximum permissible energy consumption of the emitter-collector circuit of the control transistor.

It is therefore one of the objects of this invention to provide for a regulator arrangement including overload protection in the case that a short-circuit should develop to a dangerous extent in the exciter winding of the generator.

It is a further object of this invention to provide for an arrangement as set forth which is comparatively very simple in structure and entirely reliable in operation.

With above objects in view the invention includes in a regulator arrangement for a generator having a shunt exciter winding and being operable at greatly varying speeds, in combination, control transistor means having its emitter-collector circuit connected in series with the exciter winding between the terminals of the generator for controlling the energization of said exciter winding depending upon the conductivity condition of said control transistor means; pilot transistor means having its emitter-collector circuit connected between said terminals of the generator and having its collector connected in circuit with the base of said control transistor means for rendering the latter non-conductive when said pilot transistor means is conductive, and vice versa, the base of said pilot transistor means being so connected with said terminals of the generator that said pilot transistor means is non-conductive as long as the output potential of said generator is below a predetermined value, and is rendered conductive when said value is exceeded; and overload protection means comprising resistor means and third transistor means connected between said terminals of the generator, said emitter-collector circuit of said control transistor means and the base of said pilot transistor means for applying to the latter, when during conductive condition of said control transistor means both the collector thereof and the collector of said pilot transistor means are at a negative potential of comparatively considerable magnitude, a potential by which said pilot transistor means is rendered correspondingly conductive and consequently the conductivity of said control transistor means is correspondingly reduced.

In a preferred embodiment of the invention the emitter-collector circuit of the third transistor means is connected in series with said resistor means between the terminals of the generator and in parallel with the emitter-collector circuit of the control transistor means, and the emitter of the third transistor means is connected, preferably via a rectifier means, with the base of the pilot transistor means.

Figure 2:
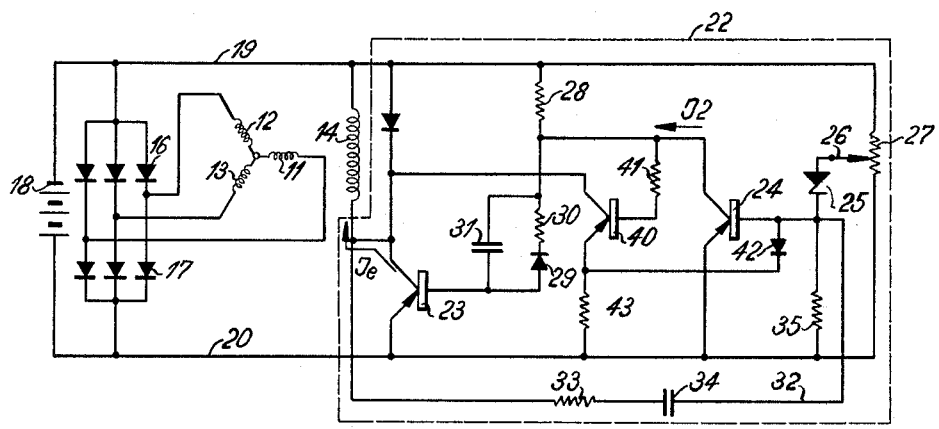

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing, in which:

FIG. 1 is a diagrammatic illustration of a generator with attached regulator and with a storage battery connected therewith; and FIG. 2 is a schematic circuit diagram of an embodiment of the invention corresponding to the arrangement of FIG. 1.

As shown in detail by FIG. 2, the generator comprises within its housing 10 three stationary alternating-current windings 11, 12 and 13 evenly distributed along the inner circumference of the housing 10, and a separate shunt exciter winding 14. The latter is mounted on an armature, not shown, rotatably supported within the housing 10 and adapted to be driven by means of a pulley 15. The alternating current windings 11, 12 and 13 are connected with each other in Y-arrangement. Each of the free ends of these windings is connected with the junction point of two series-connected rectifiers 16, 17. The input electrodes of the rectifiers 16 are connected with the negative terminal of a storage battery 18 and also with one end of the exciter winding 14 by means of a negative output line 19. The output electrodes of the rectifiers 17 are connected with the positive terminal of the storage battery 18 by means of a positive output line 20.

The regulator arrangement 22 shown in FIG. 2 is arranged within a housing 21 mounted on the generator housing 10. The purpose of the regulator arrangement is to maintain the output voltage of the generator available between the lines 19 and 20 at a constant value of e.g. about 13.5 volts. This value must not be exceeded at even very high speeds of the generator.

The regulator arrangement according to FIG. 2 comprises a control transistor 23, the emitter-collector circuit of which is connected in series with the exciter winding 14 of the generator. For controlling the conductivity of the control transistor 23 a pilot transistor 24 is provided the emitter of which is connected in the same manner as the emitter of the control transistor with the positive line 20. The base of the pilot transistor is connected via a Zener diode 25 with the tap 26 of a voltage divider 27, the latter being connected between the terminals of the generator or more specifically between the output lines 19 and 20 so that the full output voltage of the generator is applied to the ends of the voltage divider 27. The collector of the pilot transistor 24 is connected with the negative line 19 via a resistor 28 of about 20 ohms. The base of the control transistor 23 is connected via a rectifier 29 and a further resistor 30 with a junction point between the resistor 28 and the collector of the pilot transistor 24. A capacitor of about 1 µf. is connected in parallel with the series-combination formed by the rectifier 29 and the resistor 30.

When the generator operation is started from standstill the battery 18 being fully charged furnishes a voltage of 12.6 to 12.8 volts. When this voltage exists between the negative line 19 and the positive line 20 the corresponding partial voltage applied from the divider 27 to the Zener diode 25 does not render it conductive so that the pilot transistor 24 is also non-conductive and cannot carry a current flowing through the control resistor 28. Under these circumstances the control transistor 23 is conductive so that a considerable base current can flow through the emitter-base circuit of this transistor and via the rectifier 29 and the resistors 30 and 28. By the flow of this current the emitter-collector circuit of the control transistor 23 is held conductive so that an exciter current $J_e$ of about 6 amps. can flow through the exciter winding 14. The magnetic field produced by this current in the rotating armature of the generator induces in the alternating current windings 11, 12 and 13 an alternating voltage increasing with the speed of the engine, not shown, which drives the generator. This alternating voltage is rectified by the rectifiers 16 and 17 and is available for charging the battery 18 and/or for furnishing energy to current consumers not shown but connected in parallel with the battery.

As soon as the voltage between the negative line 19 and the positive line 20 reaches with the further increasing speed of the generator a value predetermined by the setting of the tap 26 of the potentiometer or voltage divider 27, the Zener diode 25 is rendered conductive and causes consequently also the pilot transistor 24 to become conductive so that now this transistor is able to carry a current $J_2$ flowing through the control resistor 28. The voltage drop across resistor 28 caused by the flow of this current has the effect that the potential at the base of the control transistor 23 rises above the potential of the positive line 20 because the voltage drop across resistor 28 is added to the voltage available at the capacitor 31 which has been in the meantime charged to about 6 volts. Thus, the starting flow of the collector current $J_2$ of the pilot transistor 24 changes the base potential of the control transistor 23 so that the latter is abruptly changed from its previous conductive condition to its non-conductive condition.

In order to accelerate this change a further resistor 33 and a capacitor of about .1 $\mu f$. are connected in series with each other and by means of the auxiliary line 32 between the collector of the control transistor 23 and the base of the pilot transistor 24. When charged, the capacitor 34 is capable of discharging to a considerable extent via a resistor 35 connected between the base of the pilot transistor 24 and the positive line 20, as long as the control transistor 23 is in conductive condition so that its collector potential is close to the potential of the positive line 20. However, as soon as the control transistor 23 is changed to non-conductive condition the potential at its collector decreases considerably toward the potential of the negative line 19 so that now the capacitor 34 is charged. The current charging the capacitor 34 through the resistor 33 renders the base of the pilot transistor still more negative and thus increases the collector current $J_2$ of the pilot transistor whereby the blocking effect produced by the pilot transistor on the control transistor is increased. Since now no exciter current $J_e$ flows through the control transistor 23, the alternating voltage induced in the alternating current windings 11 to 13 and consequently the output voltage of the generator likewise rapidly drop off. As a consequence the Zener diode 25 which up to this moment had been conductive is rendered non-conductive so that no current can flow anymore over the emitter-base circuit of the pilot transistor 24. Thus the pilot transistor 24 is rendered non-conductive and the control transistor 23 returns abruptly to its previous conductive condition. The now starting collector current of the control transistor 23 passing through the exciter winding 14 increases the magnetic excitation of the generator and the above-described cycle of operations repeats.

Within the just-described operation of the regulator arrangement as far as described up to now the control transistor 23 would be in considerable danger of being damaged when a short-circuit should develop in the exciter winding 14 affecting only a portion thereof or the entire exciter winding. Under these circumstances even with the control transistor 23 being fully conductive the excitation of the generator would be insufficient so that the generator cannot produce the desired normal voltage output whereby the pilot transistor 24 would be held continuously in non-conductive condition. On the other hand, the emitter-collector circuit of the control transistor 23 would have to carry a portion of the battery voltage which would be the greater the more turns of the exciter winding are affected by the short-circuit.

In order to prevent such a dangerous overload on the control transistor an overload protection arrangement is provided by the invention which is so constructed that it becomes effective only when simultaneously, in spite of the conductive condition of the control transistor, a negative potential of considerable magnitude exists at its collector electrode and additionally also a negative potential of considerable magnitude exists at the collector of the pilot transistor 24.

The overload protection arrangement according to the invention comprises a third transistor 40 the collector of which is connected with the collector of the control transistor 23, while the base of the transistor 40 is connected with the collector of the pilot transistor 24 via a resistor 41 of 150 ohms. A rectifier 42 is connected between the base of the pilot transistor 24 and the emitter of the third transistor 40, this emitter being connected with the positive line 20 via a resistor 43 of 50 ohms.

In operation the overload protection arrangement functions as follows. The transistor 40 can be rendered conductive only when a negative potential of considerable magnitude appears both at the collector of the control transistor 23 and at the collector of the pilot transistor 24. This condition can be met only when the output voltage of the generator is below its predetermined normal value so that the pilot transistor 24 is in non-conductive condition as mentioned above. Under these circumstances the control transistor 23 must be in conductive condition. However, under these circumstances a negative potential of considerable magnitude can develop at the collector of the control transistor 23 only when the direct current resistance of the exciter winding 14 is considerably reduced by a short-circuit. If now under these conditions the third transistor 40 is rendered conductive a voltage drop of such magnitude develops across the emitter resistor 43 that the control transistor 23 is also rendered conductive although the predetermined normal output voltage of the generator is not available. As a matter of fact, in this case the collector current $J_2$ of the pilot transistor 24 will have a value substantially smaller than in the above described normal operating condition. Due to the above mentioned selection of resistance values for the resistors 28 and 30 and of the resistors 41 and 43 the base current of the control transistor 23 is at least considerably reduced and the control transistor 23 will, therefore, carry only a comparatively weak collector current in spite of the comparatively high emitter-collector voltage applied thereto. As a consequence thereof it is assured that the energy consumption in the emitter-collector circuit of the control transistor will remain small. In this manner the control transistor 23 is protected against the above-described overload.

It is a particular advantage of this arrangement that the overload protection arrangement does not interfere with the normal operation of the regulator by which the control transistor 23 is alternatingly changed between conductive and non-conductive conditions, as long as the exciter winding 14 has its original resistance. It is a further advantage of this arrangement that it responds even to very brief or transitory short-circuits which may last for instance only through fractions of a millisecond. This is very important because the resulting very brief overloads could produce an immediate breakdown of the emitter-base circuit of the control transistor 23.

It will be understood that each of the elements described above or two or more together, may also find a useful application in other types of regulator arrangements for a generator differing from the types described above.

While the invention has been illustrated and described as embodied in a regulator arrangement for a generator having a shunt exciter winding and being operable at greatly varying speeds, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. A regulator arrangement for a generator having a shunt exciter winding and being operable at greatly varying speeds, particularly for a vehicle lighting generator, comprising, in combination, control transistor means having its emitter-collector circuit connected in series with the exciter winding between the terminals of the generator for controlling the energization of said exciter winding depending upon the conductivity condition of said control transistor means; pilot transistor means having its emitter-collector circuit connected between said terminals of the generator and having its collector connected in circuit with the base of said control transistor means for rendering the latter non-conductive when said pilot transistor means is conductive, and vice versa, the base of said pilot transistor means being so connected with said terminals of the generator that said pilot transistor means is non-conductive as long as the output potential of said generator is below a predetermined value, and is rendered conductive when said value is exceeded; and overload protection means comprising resistor means and third transistor means connected between said terminals of the generator, said emitter-collector circuit of said control transistor means and the base of said pilot transistor means for applying to the latter, when during conductive condition of said control transistor means both the collector thereof and the collector of said pilot transistor means are at a negative potential of comparatively considerable magnitude, a potential by which said pilot transistor means is rendered correspondingly conductive and consequently the conductivity of said control transistor means is correspondingly reduced.

2. A regulator arrangement for a generator having a shunt exciter winding and being operable at greatly varying speeds, particularly for a vehicle lighting generator, comprising, in combination, control transistor means having its emitter-collector circuit connected in series with the exciter winding between the terminals of the generator for controlling the energization of said exciter winding depending upon the conductivity condition of said control transistor means; pilot transistor means having its emitter-collector circuit connected between said terminals of the generator and having its collector connected in circuit with the base of said control transistor means for rendering the latter non-conductive when said pilot transistor means is conductive, and vice versa, the base of said pilot transistor means being so connected with said terminals of the generator that said pilot transistor means is non-conductive as long as the output potential of said generator is below a predetermined value, and is rendered conductive when said value is exceeded; and overload protection means comprising resistor means and third transistor means, the emitter-collector circuit thereof being connected in series with said resistor means between said terminals of the generator and in parallel with said emitter-collector circuit of said control transistor means, the base of said third transistor means being connected with the collector of said pilot transistor means, and the emitter of said third transistor means being connected with the base of said pilot transistor means for applying to the latter, when during conductive condition of said control transistor means both the collector thereof and the collector of said pilot transistor means are at a negative potential of comparatively considerable magnitude, a potential by which said pilot transistor means is rendered correspondingly conductive and consequently the conductivity of said control transistor means is correspondingly reduced.

3. A regulator arrangement for a generator having a shunt exciter winding and being operable at greatly varying speeds, particularly for a vehicle lighting generator, comprising, in combination, control transistor means having its emitter-collector circuit connected in series with the exciter winding between the terminals of the generator for controlling the energization of said exciter winding depending upon the conductivity condition of said control transistor means; pilot transistor means having its emitter-collector circuit connected between said terminals of the generator and having its collector connected in circuit with the base of said control transistor means for rendering the latter non-conductive when said pilot transistor means is conductive, and vice versa, the base of said pilot transistor means being so connected with said terminals of the generator that said pilot transistor means is non-conductive as long as the output potential of said generator is below a predetermined value, and is rendered conductive when said value is exceeded; and overload protection means comprising resistor means and third transistor means, the emitter-collector circuit thereof being connected in series with said resistor means between said terminals of the generator and in parallel with said emitter-collector circuit of said control transistor means, the base of said third transistor means being connected with the collector of said pilot transistor means, and a rectifier means being connected between the emitter of said third transistor means and the base of said pilot transistor means for applying to the latter, when during conductive condition of said control transistor means both the collector thereof and the collector of said pilot transistor means are at a negative potential of comparatively considerable magnitude, a potential by which said pilot transistor means is rendered correspondingly conductive and consequently the conductivity of said control transistor means is correspondingly reduced.

4. A regulator arrangement for a generator having a shunt exciter winding and being operable at greatly varying speeds, particularly for a vehicle lighting generator, comprising, in combination, control transistor means having its emitter-collector circuit connected in series with the exciter winding between the terminals of the generator for controlling the energization of said exciter winding depending upon the conductivity condition of said control transistor means; pilot transistor means having its emitter-collector circuit connected between said terminals of the generator and having its collector connected in circuit with the base of said control transistor means for rendering the latter non-conductive when said pilot transistor means is conductive, and vice versa, the base of said pilot transistor means being so connected with said terminals of the generator that said pilot transistor means is non-conductive as long as the output potential of said generator is below a predetermined value, and is rendered conductive when said value is exceeded; and overload protection means comprising first resistor means and third transistor means, the emitter-collector circuit thereof being connected in series with said first resistor means between said terminals of the generator and in parallel with said emitter-collector circuit of said control transistor means, the emitter of said third transistor means being connected with the base of said pilot transistor means for applying to the latter, when during conductive condition of said control transistor means both the collector thereof and the collector of said pilot transistor means are at a negative potential of comparatively considerable magnitude, a potential by which said pilot transistor means is rendered correspondingly conductive and consequently the conductivity of said control transistor means is correspondingly reduced, second resistor means being connected between one terminal of said generator and the base of said control transistor means and in series with said first resistor means, and the collector of said pilot transistor means being connected with the junction point between said first and second resistor means and with the base of said third transistor means.

5. A regulator arrangement for a generator having a shunt exciter winding and being operable at greatly varying speeds, particularly for a vehicle lighting generator, comprising, in combination, control transistor means having its emitter-collector circuit connected in series with the exciter winding between the terminals of the generator for controlling the energization of said exciter winding depending upon the conductivity condition of said control transistor means; pilot transistor means having its emitter-collector circuit connected between said terminals of the generator and having its collector connected in circuit with the base of said control transistor means for rendering the latter non-conductive when said pilot transistor means is conductive, and vice versa, the base of said pilot transistor means being so connected with said terminals of the generator that said pilot transistor means is non-conductive as long as the output potential of said generator is below a predetermined value, and is rendered conductive when said value is exceeded; and overload protection means comprising first resistor means and third transistor means, the emitter-collector circuit thereof being connected in series with said first resistor means between said terminals of the generator and in parallel with said emitter-collector circuit of said control transistor means, a rectifier means being connected between the emitter of said third transistor means and the base of said pilot transistor means for applying to the latter, when during conductive condition of said control transistor means both the collector thereof and the collector of said pilot transistor means are at a negative potential of comparatively considerable magnitude, a potential by which said pilot transistor means is rendered correspondingly conductive and consequently the conductivity of said control transistor means is correspondingly reduced, second resistor means being connected between one terminal of said generator and the base of said control transistor means and in series with said first resistor means, and the collector of said pilot transistor means being connected with the junction point between said first and second resistor means and with the base of said third transistor means.

References Cited by the Examiner
UNITED STATES PATENTS 2,980,843 4/1961 Conger et al. _____ 322—28
3,079,543 2/1963 Decher _____ 322—22

LLOYD McCOLLUM, *Primary Examiner.*